United States Patent [19]

Briese

[11] 4,320,999
[45] Mar. 23, 1982

[54] COOLANT GUIDE FOR END MILL

[76] Inventor: Leonard A. Briese, 5039 Browndeer La., Rancho Palos Verdes, Calif. 90274

[21] Appl. No.: 129,995

[22] Filed: Mar. 13, 1980

[51] Int. Cl.³ .............................................. B23C 9/00
[52] U.S. Cl. ...................................... 409/136; 408/59
[58] Field of Search .................. 409/136, 135; 407/11; 408/56, 59, 60

[56] References Cited

U.S. PATENT DOCUMENTS

| | | | |
|---|---|---|---|
| 580,399 | 4/1897 | Hoenscheid | 408/59 |
| 594,329 | 11/1897 | Cox | 408/59 X |
| 1,439,567 | 12/1922 | Maupin | 408/56 |
| 2,008,031 | 7/1935 | Miltner | 408/56 |
| 2,478,846 | 8/1949 | Smith | 408/59 |
| 2,510,203 | 6/1950 | Andreasson | 408/56 |

FOREIGN PATENT DOCUMENTS

| | | | |
|---|---|---|---|
| 543024 | 8/1922 | France | 408/59 |
| 172828 | 12/1921 | United Kingdom | 408/59 |

Primary Examiner—William R. Briggs
Attorney, Agent, or Firm—Eric T. S. Chung

[57] ABSTRACT

A coolant flow guide system for an end mill is disclosed. The flow guide system is characterized by a flow guide collar that is adapted to be slipped around and over the end of a conventional end mill to provide a controlled fluid seal at the lowermost end of a conventional machine spindle. Coolant directed into the flow guide collar, either by a center-feed ducting system including a central duct through the length of a conventional drawbar or the use of an optional impellor cup in conjunction with a standard coolant nozzle, is directed into the flutes of an end mill to provide efficient cooling, lubrication, and a wash.

5 Claims, 7 Drawing Figures

COOLANT GUIDE FOR END MILL

BACKGROUND OF THE INVENTION

1. Field of the Invention

The present invention is directed to cooling systems for end mills. More particularly, the present invention concerns a coolant flow guide system that may be readily used with a variety of end mills for the purpose of directing coolant over the flutes of an end mill to provide efficient cooling.

2. Description of the Prior Art

The standard cooling system for end mills, and other machine tool systems, involves coolant being directed at a machine tool by a nozzle connected through a hose or the like to a reservoir of coolant. The coolant is usually pumped from the reservoir to a single nozzle that is used to flood the area of the end mill or other machine tool.

The single nozzle is normally clamped in a stationary position pointing at the end mill to have emitted coolant strike the end mill. As a result the coolant in conventional systems is continually washing over a machine tool from a single direction and has the drawback of washing chips and other metal particles into the work area and towards the machine tool rather than away from the work area and the machine tool.

Clearly, the commonly used single stream of coolant does not provide efficient cooling, and further can produce extra wear and tear on the machine tool by reason of having metal particles washed into the work area and against the machine tool. Further, whatever lubricating effect the coolant would normally have is countered by having such machine particles continually directed towards the work area.

OBJECTS AND SUMMARY OF THE INVENTION

It is accordingly a primary object of the present invention to provide a coolant flow guide system that efficiently directs coolant towards and through the flutes of an end mill to have the coolant efficiently cool the end mill and additionally wash chips and other metal particles away from the work area.

It is another object of the present invention to provide a coolant flow guide system that may be readily used with conventional end mills.

It is a further object of the present invention to provide a coolant flow guide system that is readily useable with machine tool systems equipped with a center-feed coolant system.

It is a further object of the present invention to provide a coolant flow guide system that is also useable with machine tool systems having standard single nozzle coolant feed systems.

More particularly, the coolant flow guide system in accordance with the present invention includes a flow guide collar that is generally shaped as a cupped disk with a central aperture that is adapted to be fit over and around an end mill to form a controlled fluid seal at the botton of a standard spindle. Coolant directed through the spindle and the enclosed collar via a center-feed coolant system is directed downward to the flutes of an end mill through appropriately placed flow guide orifices, the number of which correspond to the number of flutes used on an end mill.

Single nozzle machine tool systems not having a center-feed coolant system are accommodated by the use of an optional impellor adaptor that is secured around the lowermost periphery of the standard spindle by an adaptor clamp. The impellor adaptor in conjunction with the adaptor clamp serves to feed coolant into the flow guide collar.

Further objects and the many attendant advantages of the invention may be best understood by reference to the following detailed description taken in conjunction with the accompanying drawings in which like reference symbols designate like parts throughout the figures thereof.

DESCRIPTION OF THE PREFERRED EMBODIMENT

Figures 1, 2, 3:
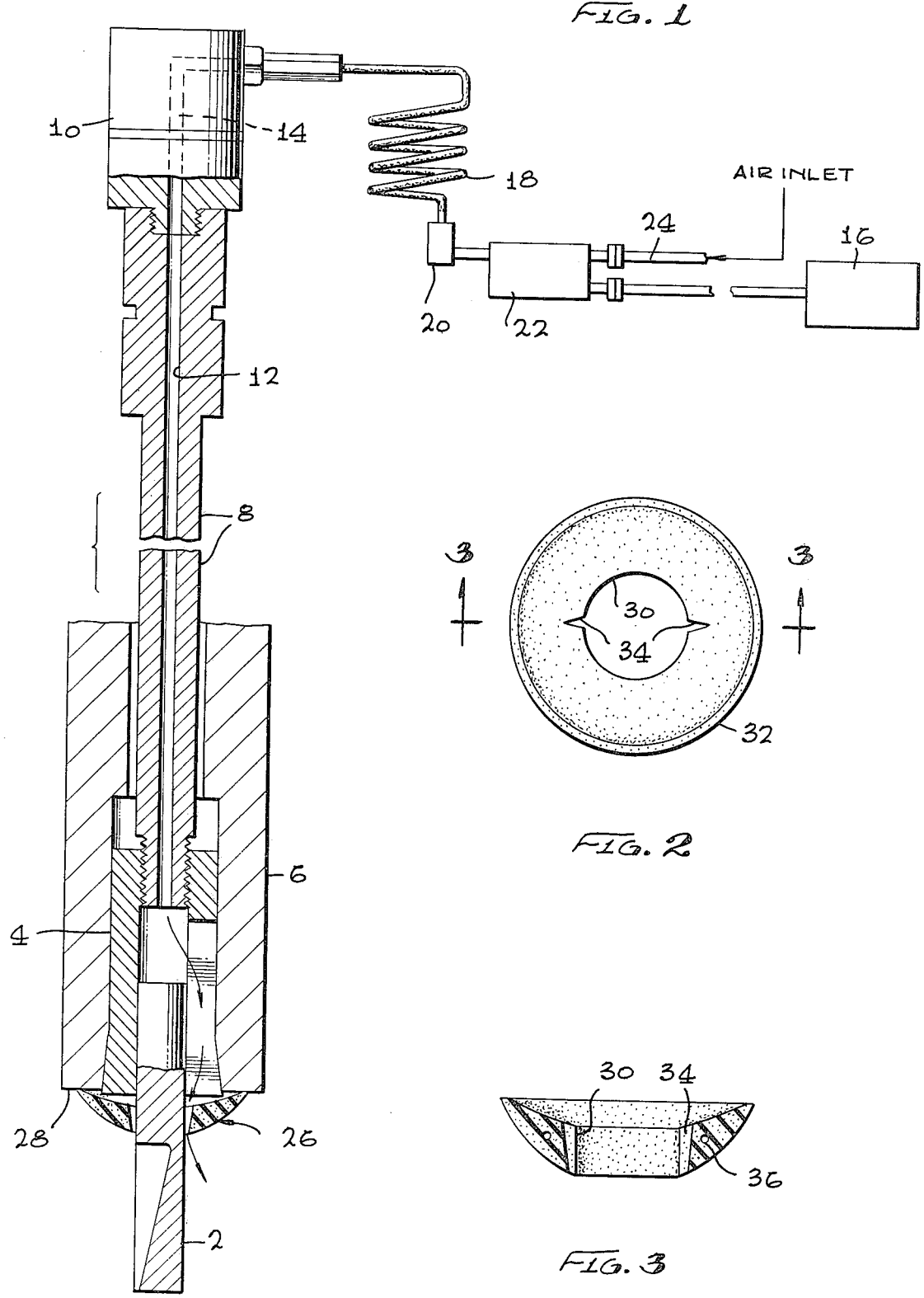
FIG. 1 is a schematic diagram illustrating a side view of a machine tool system adapted to have a coolant flow guide collar in accordance with the present invention.
FIG. 2 is a top view of a coolant flow guide collar in accordance with the present invention.
FIG. 3 is a cross-sectional side view of a coolant flow guide collar in accordance with the present invention.

Referring to FIG. 1 of the drawings, an end mill 2 is operatively positioned on a milling machine by being fitted into the slotted end of a collet 4 which is tightened down on the end of the end mill by a standard machine spindle 6. As shown, the upper end of the collet 4 is threaded onto the end of a drawbar 8 which is in turn connected at its upper end to a rotating union 10.

When equipped with a center-feed coolant system the drawbar 8 is provided with a central duct 12 extending for the length of the drawbar 8 generally along its longitudinal axis. The rotation union 10 would also be equipped with a central duct 14 which communicates with the central duct 12 whenever the drawbar 8 and the rotating union 10 are connected.

Coolant is directed through the ducts 12 and 14 from a pressurized reservoir 16 via a flexible hose 18, a flow control valve 20, and a filter 22, if used.

The pressurized reservoir 16 may consist of a conventional pump which is used in combination with a catchment basin or tank. The flow control valve 20 may be of any standard type well known in the prior art which functions to mix coolant from the pressurized reservoir 16 with a predetermined amount of air under pressure that may be provided to the control valve 20 through the filter 22 via an input hose 24 from a suitable source. The flow control valve 20 would normally function to have only coolant, only air, or a coolant mist (formed by mixing coolant and air) passed through the cooling system.

The use of a flexible hose 18 facilitates movement of the drawbar 8, the rotating union 10, the machine quill, the machine head and the machine ram in the course of operating the milling machine.

As shown in FIG. 1, a flow guide collar 26 is operatively positioned around the midsection of the end mill 2 and abutting the lower end 28 of the machine spindle 6 to have coolant fed into the collar 26 through the central duct 12 and the side slots 29 of the collet 4.

Referring to FIGS. 2 and 3, it can be observed that a flow guide collar 26 is shaped to have the form of a concave disk. A central aperture 30 is provided in the center of the collar 26 and is intended to be sized slightly smaller that the outer diameter of an end mill with which the flow guide collar 26 is to be used. As is apparent in FIG. 3, the concave shape of the flow guide collar 26 permits the rim 32 to be forced up against the lowermost end 28 of the machine spindle 6 to form a fluid seal. A pair of grooves 34 serve to guide coolant down to the flutes of the end mill 2. The actual number of grooves 34 used on a flow guide collar 26 corresponds to the number of flutes on an end mill.

The flow guide collar 26 may be constructed by using a soft rubber or other similar material. The rubber material may be impregnated with an abrasive to furnish added gripping and thereby prevent slipping between the flow guide collar 26 and the end mill 2 when it is mounted thereon as shown in FIG. 1.

A spring clamp 36 may be fitted into the body of the flow guide collar 26 to provide additional clamping force to further prevent slippage of the flow guide collar 26 when mounted on an end mill 2.

Figure 4:
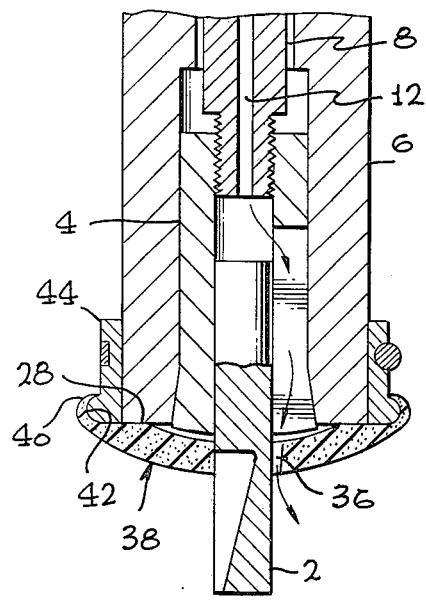
FIG. 4 is a cross-sectional side view of an alternate embodiment of a coolant flow guide collar mounted around an end mill in an operative position.

An alternate embodiment of a coolant flow guide collar 38 is shown in FIG. 4 of the drawings. As shown, the collar 38 is provided with a concave upper rim portion 40 which is adapted to be snap fit over a peripheral boss 42 that is formed on the lower periphery of an adapter clamp 44. The adapter clamp is intended to be secured to the lower end 28 of the machine spindle 6 for the purpose of facilitating attachment of the coolant flow guide collar 38.

The alternate embodiment shown in FIG. 4 provides yet additional means for securing a flow guide collar 26 around the midsection of an end mill 2.

As with the embodiment showing FIGS. 1, 2 and 3, coolant is fed into the flow guide collar 38 via the central duct 12, and the side slots 29 of the collet 4. The grooves 36 continue to serve to feed coolant from the collar 38 to the flutes of the end mill 2. As is necessary, the flow guide collar 38 may be twisted or rotated on the end mill 2 to have the grooves 36 properly aligned to feed coolant to the flutes of the end mill 2.

Figure 6:
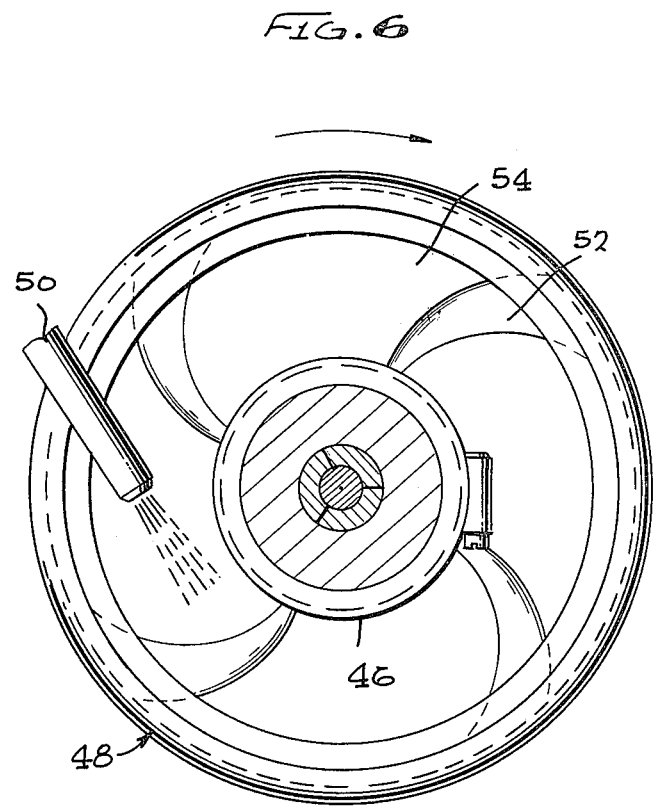
FIG. 6 is a top view of an impellor adaptor in accordance with the present invention.
Figure 5:
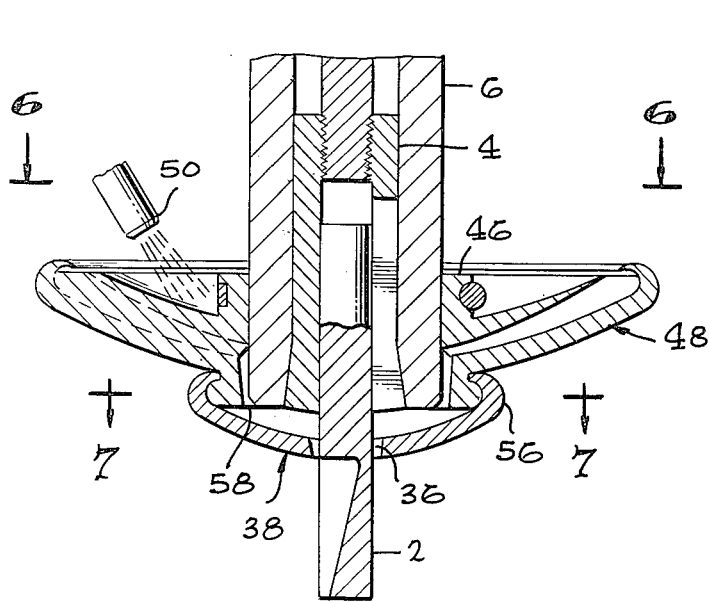
FIG. 5 is a cross-sectional side view of another embodiment of a coolant flow guide system including an impellor adaptor operatively positioned around a machine tool spindle in accordance with the present invention.
Figure 7:
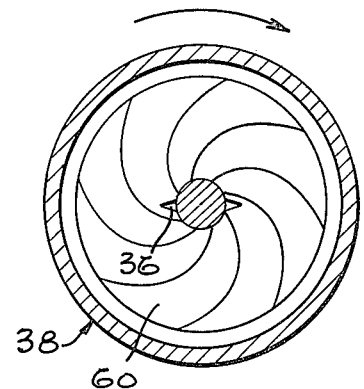
FIG. 7 is a top view of an alternate embodiment of a coolant flow guide collar in accordance with the present invention.

Referring now to FIGS. 5, 6 and 7, a further embodiment of the subject invention is designed to accommodate milling machines which are not equipped with a center-feed coolant system. As shown in FIGS. 5 and 6, the adapter 44 shown in FIG. 4 is replaced by an adapter 46 equipped with an impellor dish 48 having a generally concave configuration. The impellor dish 48 serves to receive coolant that may be supplied from a conventional coolant nozzle 50 and feed the same downwardly towards the flutes of an end mill 2.

As shown in FIG. 6, the upper surface of the impellor dish 48 is provided with a plurality of spiral impellor blades 52 which are nominally raised above a floor position 54 of the impellor dish 48. As shown, the spiral impellor blades 52 are curved in the general direction of the usual rotation of the end mill 2 when it is in operation.

The adapter 46 is provided with a peripheral boss 56 at the lower outer periphery thereof and beneath the underside of the impellor dish 48. The function of the boss 56 will be explained with greater particularity hereinafter. As shown in FIG. 5, a lower portion 58 of the central opening of the adapter 46 is sized slightly larger than the outer diameter of the machine spindle 6 to permit coolant fed into the upper surface of the impellor dish 48 to be forced downwardly by the nozzle force and rotation of the dish 48 into the flow guide collar 38 which is supported on the boss 56 in a fashion previously described in conjunction with FIG. 4.

The flow guide collar 38 may be modified as illustrated by FIG. 7. Specifically, the upper surface of the flow guide collar 38 may be provided with impellor blades or tracks 60, which would simply be spiraled troughs or terraces which serve to guide coolant towards the center of the collar 38 to be drained downwardly through the grooves 34 to the flutes of an end mill 2. As shown, the spiral pattern of the tracks 60 is curved in the direction of rotation of the end mill 2.

From the foregoing description, it is now clear that the present invention provides a simple, but effective, coolant flow guide system for an end mill, which serves to efficiently direct coolant to the flutes of an end mill, and thereafter, away from a work area to provide the added advantage of a washing action.

The foregoing description of the present invention concerns preferred embodiments that have been developed to date, it is not intended to be limiting with respect to the broad principles involved herein. For example, the present invention could be applied to other machine tools besides end mills. As an example, the present invention is highly suitable for use with drills and the like. Further, while the use of grooves is discussed in the description, an oversized central aperture 30 may be used to permit flooding of the machine tool.

Further, while preferred embodiments of the present invention have been described hereinabove it is intended that all matters contained in the above description and shown in the accompanying drawings be interpreted as illustrative and not in a limiting sense and that all modifications, constructions, and arrangements which fall within the scope and spirit of the invention may be made.

What is claimed is:

1. A coolant flow guide system for end mills having flutes and used on a milling machine employing a collet and a machine spindle combination to retain the end mill in an operating position, said coolant flow guide system including:

collar means for receiving coolant and draining said coolant down to the flutes of an end mill, said collar means having a central aperture and a concave shape including a concave surface, said central aperture being round and having one or more grooves in walls thereof, said concave surface of said collar means having a plurality of spiral sections extending from said central aperture to the periphery of said concave surface for urging coolant contained therein towards said central aperture when said collar means is rotated with an end mill on which it is mounted, said collar means being operatively mounted on an end mill by having the end mill extend through said central aperture with said concave surface situated to receive coolant and said grooves aligned to permit coolant received by said concave surface to drain to said flutes.

2. A coolant flow guide system for end mills having flutes and used on a milling machine employing a collet and a machine spindle combination to retain the end mill in an operating position, said coolant flow guide system including:

collar means for receiving coolant and draining said coolant down to the flutes of an end mill, said collar means having a central aperture and a concave shape including a concave surface, said central aperture being round and having one or more grooves in walls thereof, said collar means being operatively mounted on an end mill by having the end mill extend through said central aperture with said concave surface situated to receive coolant and said grooves aligned to permit coolant received by said concave surface to drain to said flutes; and adaptor means for facilitating retention of said collar means in an operative position on an end mill, said adaptor means including a ring section adapted to be fit around a machine spindle, the lower outer wall of said ring section having a boss thereon;

said collar means having the upper edge of said concave surface curled inwardly to be fit over said boss on said adaptor means and be retained thereon.

3. The coolant flow control system defined by claim 2, wherein said adaptor means further includes an impellor dish portion extending from and around the outer wall of said ring section to receive coolant therein.

4. The coolant control system defined by claim 3, said impellor dish having an upper surface that is cupped, said upper surface having thereon a plurality of spiral impellor blades extending upward from the floor of said impellor dish for urging coolant in said impellor dish towards the center of said adaptor means.

5. The coolant control system defined by claim 4, the inner diameter of the lower portion of said adaptor means being enlarged to permit coolant in said impellor dish to drain downwardly through said enlarged portion.

* * * * *